June 2, 1970  P. C. TABOR  3,515,433
ROTARY SEAT BACK ADJUSTER
Filed Dec. 12, 1968  2 Sheets-Sheet 1
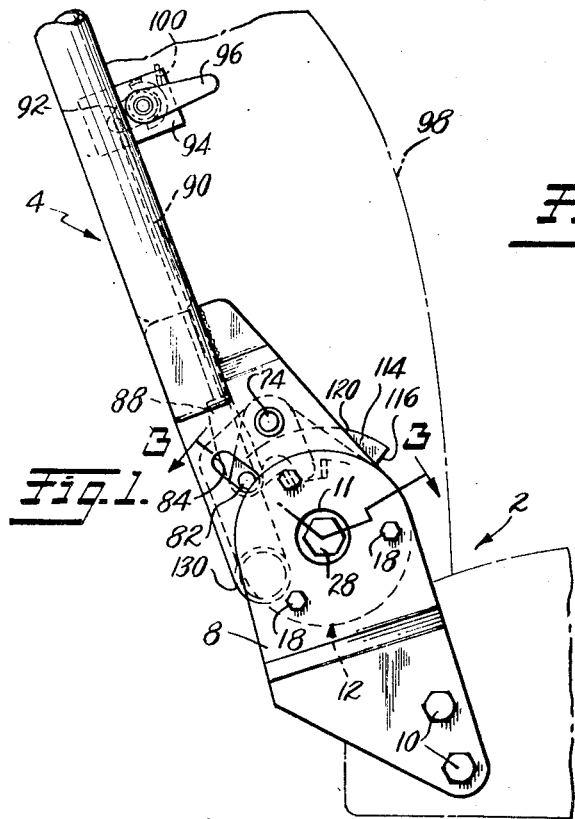
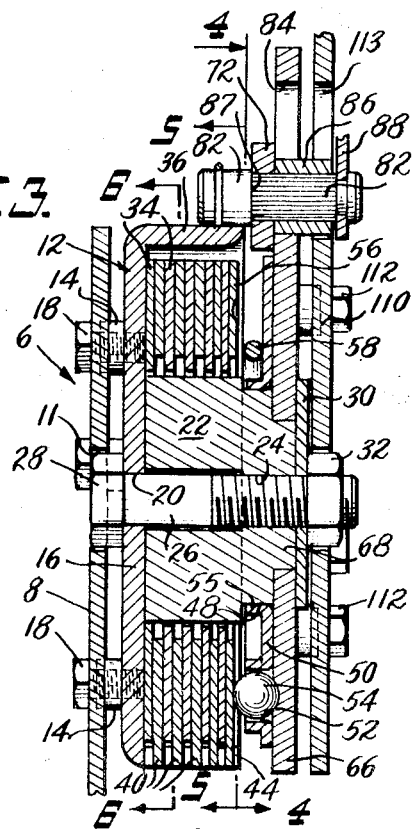
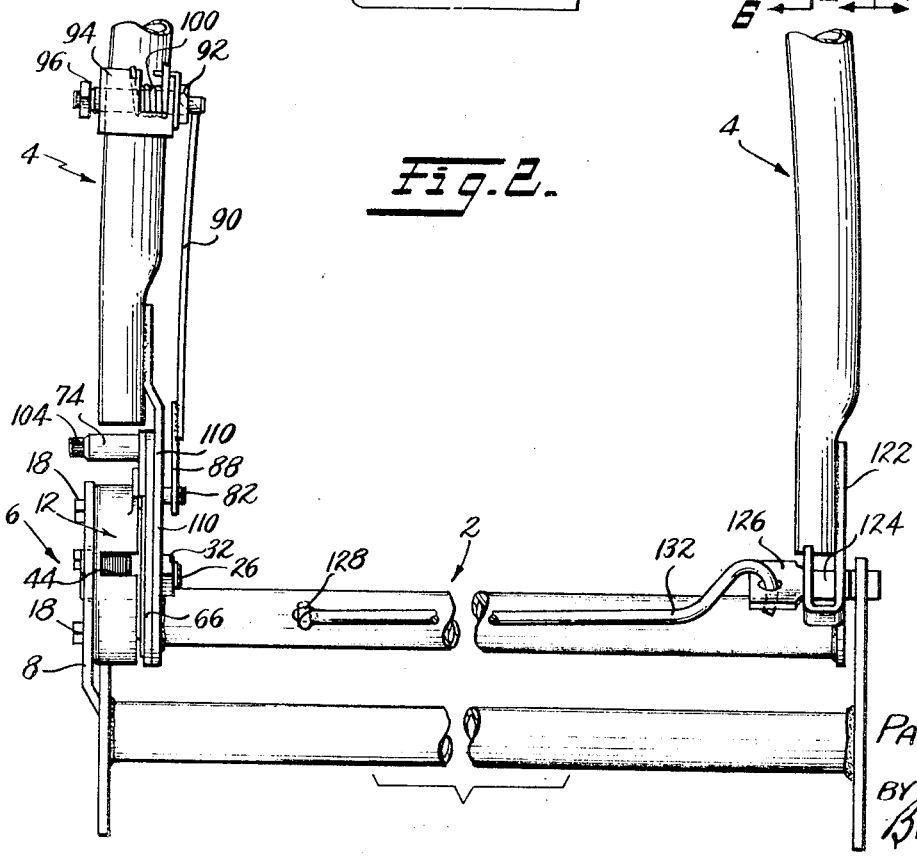
INVENTOR.
PAUL C. TABOR
BY Bacon & Thomas
ATTORNEYS June 2, 1970 P. C. TABOR 3,515,433
ROTARY SEAT BACK ADJUSTER
Filed Dec. 12, 1968 2 Sheets-Sheet 2
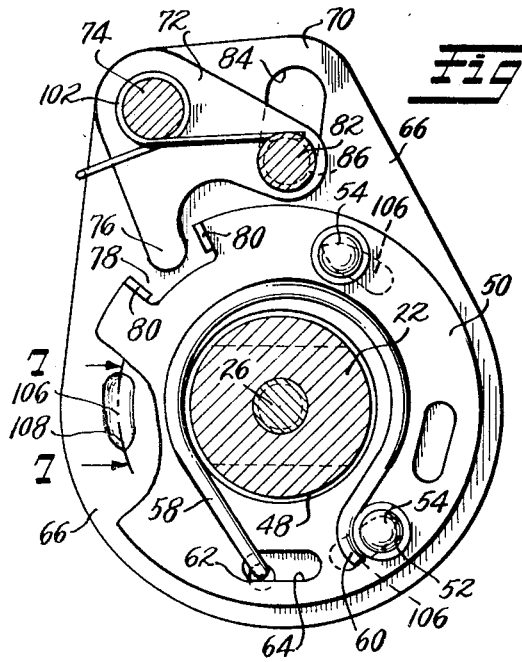
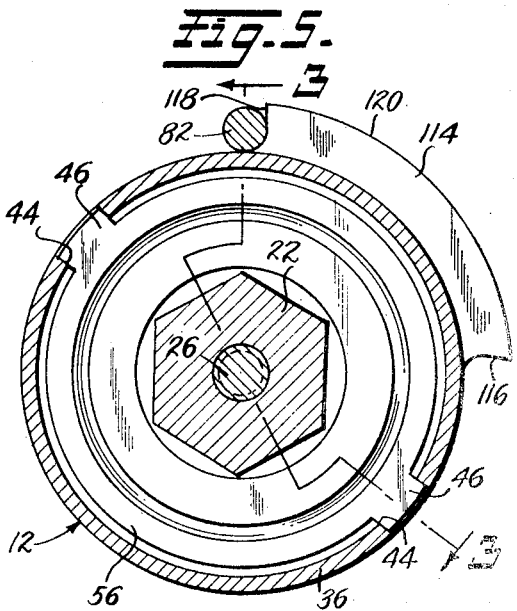
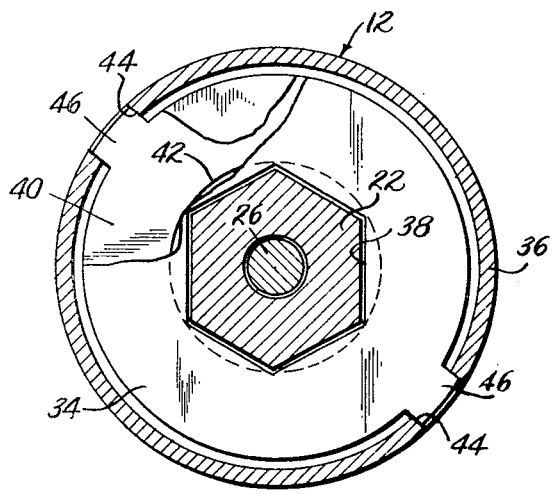
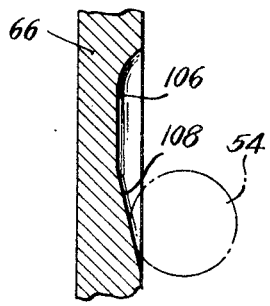
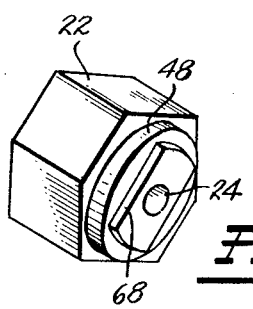
INVENTOR.
PAUL C. TABOR
BY Bacon & Thomas
ATTORNEYS United States Patent Office 3,515,433
Patented June 2, 1970

3,515,433
ROTARY SEAT BACK ADJUSTER
Paul C. Tabor, Clawson, Mich., assignor to Meteor Research Limited, a partnership composed of Wally H. Kozlowske and Paul C. Tabor, Roseville, Mich.
Filed Dec. 12, 1968, Ser. No. 783,305
Int. Cl. B60n 1/04
U.S. Cl. 297—374
9 Claims

ABSTRACT OF THE DISCLOSURE

A rotary multiple friction plate mechanism with relatively rotatable parts secured to a seat and tiltable seat back, respectively, is normally locked by a spring urged ball-and-cam arrangement to exert axial pressure on the friction plates. A manual control releases the axial pressure to permit seat adjustment, the ball-and-cam arrangement being self energizing against forceable rearward tilting of the seat back. A positive lock prevents forward tilt of the seat back from a normal position and holds the manual control in release position when released and the seat back is swung forwardly from normal position.

BACKGROUND OF THE INVENTION

This invention relates to seats with reclining backs and more specifically, to novel position adjusters capable of holding the backs of such seats in an infinite number of inclined positions.

Position adjusters are well known and are widely employed for reclining seat backs in automobiles, buses, and the like. The majority of the heretofore available position adjusters are equipped with ratchet and pawl mechanisms which provide a limited number of adjusted positions depending upon the number and spacing of the teeth on the ratchet. Such position adjusters, in addition to having only a small number of adjustment positions which cannot be altered by the user, are noisy and subject to rapid wear. A need has therefore long existed for position adjusters having a wider range of adjustment, quieter operation, and a longer service life.

Pat. No. 3,195,952 seeks to overcome some of the above objections but purposes a device unduly bulky and expensive to produce. Pat. No. 2,980,170 suggests a stack of circular friction plates alternate ones of which are secured to a stationary member and to an adjustable member, respectively. A plurality of balls apply pressure to the plates and a manually rotatable member carrying a cam relieves or applies axial pressure to the balls which are mounted in nonrotatable cages.

SUMMARY OF THE INVENTION

Applicant's invention herein comprises a stack of circular friction plates alternately held by inner and outer relatively rotatable members, one of which is secured to an automobile seat frame and the other of which is secured to a tiltable seat back frame. Pressure is applied to the plates to lock the mechanism by relative rotation between a cage carrying balls and an element having cam surfaces, the cage being spring urged to rotate in a direction to lock the plates together. Manual means are provided for overcoming the force of the spring by rotating the ball cage and further positive locking means are provided for positively locking the seat back against forward movement when in one position of adjustment and for holding the balls released from the friction plates during a predetermined range of swinging movement of the seat back.

BRIEF DESCRIPTION OF THE DRAWINGS

FIG. 1 is a side view of a seat frame and seat back frame having the present invention applied thereto;
FIG. 2 is a diagrammatic front view of the structure shown in FIG. 1;
FIG. 3 is an enlarged sectional view taken on the line 3—3 of FIGS. 1 and 5;
FIG. 4 is a sectional view taken on the line 4—4 of FIG. 3 with certain parts broken away;
FIG. 5 is a sectional view taken on the line 5—5 of FIG. 3;
FIG. 6 is a sectional view taken on the line 6—6 of FIG. 3 with certain parts being broken away;
FIG. 7 is an enlarged sectional view on the line 7—7 of FIG. 4; and
FIG. 8 is a perspective view of the hexagonal hub portion of the device.

DESCRIPTION OF A PREFERRED EMBODIMENT

Referring first to FIGS. 1 and 2, numeral 2 designates generally an automobile seat frame and numeral 4 designates generally the frame of a tiltable seat back pivotally mounted on the seat 2. Numeral 6 designates generally a novel adjustment mechanism. A supporting plate 8 is secured to the seat frame by such means as bolts 10, to be fixedly supported thereby. As seen in FIGS. 1 and 3 the plate 8 is provided with a circular opening 11, the axis of which defines a pivot axis for the mechanism. A cup-shaped member 12 is provided with bosses 14 integral with its bottom wall 16, which bosses threadedly receive bolts 18 by which the cup member 12 is fixedly secured to the plate 8. The bottom wall 16 of the cup member is provided with a central opening 20 concentric to the opening 11 but of a smaller size. A hexagonal hub 22 (see also FIG. 8) is provided with a bore therethrough a portion 24 of which is internally threaded. A bolt 26 having a head 28 extends through the central opening 20, with its head lightly bearing against the outer surface of the bottom wall 16 and loosely positioned in the opening 11 and threadedly engages the threaded portion 24 in hub 22. A spring washer 30 bears against the right hand end of the hub 22, as seen in FIG. 3, and a nut 32 serves as a lock nut to lock the bolt 26 and hub 22 in fixed relation. The parts are so adjusted that the hub 22 is caused to bear lightly against the bottom wall 16 of the cup member with the bolt and the hub member being free to rotate within the cup 12.

A plurality of circular friction plates 34 are of a diameter to fit loosely within the cup member 12 inwardly of the outer wall 36 thereof and are provided with hexagonal openings 38 (FIG. 6) slightly larger than the hexagonal hub 22. Thus, the plates 34 are to slide axially on the hub 22 but cannot rotate relative thereto through more than an extremely small angle. Alternating with the plates 34 are further plates 40 having circular central openings 42 (see also FIG. 6) and of an outer diameter to be loosely received within the cup member 12. The circular openings 42 in the plates are large enough to permit those plates to rotate freely around the hub 22. The peripheral wall 36 of the cup member 12 is provided with diametrically opposed axial slots 44 (FIG. 6) receiving integral ears 46 extending outwardly from the plates 40. Thus, it can be seen that the stack of plates comprising alternating plates 34 and 40 are interleaved with alternate plates being nonrotatable related to the cup 12 and the hub 22, respectively.

The hub 22 is provided with a circular intermediate portion 48 (FIGS. 3 and 8) on which a ball cage 50 is journalled. The sheet metal ball cage 50 is provided with, as shown, three coined openings 52 each loosely receiving a steel ball 54 and an inner flange 55 journalled on the circular portion 48. The balls 54 bear against an annular pressure plate 56, also keyed to cup 12 by ears 46 and constituting an end plate of the stack of friction plates already described. A spring 58 (see FIG. 4) has one end thereof formed to define a hook 60 engaging the boundary wall of an opening 52 and the spring extends therefrom around the hub 22 and is provided with an axially extending end 62 projecting through a slot 64 in the cage 50 into anchored relation to a plate 66 lying outwardly of the ball cage 50 and having a noncircular end portion 68 on the hub 22. The spring washer 30, previously described, extends radially far enough to engage the outer face of the plate 66 and holds the same in assembled relationship to the hub 22 whereby the plate 66 and hub 22 constitute, in effect, a single mechanical unit.

As best seen in FIG. 4, the plate 66 is noncircular in shape and is provided with an upwardly extending portion 70 on which a pawl or release lever 72 is pivotally mounted. The lever 72 is fixed to a pivot shaft 74 journalled in the portion 70 of plate 66 and is provided with a first rounded end portion or nose 76 extending loosely into a notch 78 formed in the periphery of the ball cage 50. The notch 78 is formed by slitting the peripheral portion of the cage 50 and bending lugs or flanges 80 upwardly therefrom to define abutment surfaces engageable with the nose 78. A further pin 82 is fixed to the pawl lever 72 and one end thereof extends loosely through an elongated slot 34 in the plate 66. The pin 82 also extends forwardly (see FIG. 3) to overlie the outer periphery of the wall 36 of cup 12. Preferably, the pin 82 is provided with a sleeve 86 pressed thereon, to hold shoulder 87 against lever 72, and also extends loosely through the slot 84 and at its outer end the pin 82 is pivotally and slidably engaged in the lower end of a slot in a link 88 shown as being welded to a rod 90 extending upwardly to one end of handle lever arm 92 journalled in a bracket 94 secured to the frame 4 of the seat back. The handle lever 92 also includes a manually operable and accessible handle portion 96 which will be accessible to the user when the seat back frame is covered with upholstery or cushioning, such as suggested at 98 in FIG. 1. Preferably, a spring 100 biases the handle in a direction to urge the rod 90 downwardly and thereby release the lever 72 to move to the position shown in FIG. 4. A spring 102 (FIG. 4) is arranged to bias the lever 72 in the same direction to move lever 72 to the position shown, which is the normal position of the release lever. As shown in FIG. 2, the pivot pin 74 is elongated outwardly and is provided with a knurled or rib end portion whereby a handle may be fixedly secured thereon for swinging the lever 72 directly. By means of this alternative mounting a handle on the pivot pin 74 may be actuated to release the mechanism, as is obvious.

As previously stated, the balls 54 bear against pressure plate 56 and the spring 58 urges the ball cage to rotate in a counterclockwise direction, as seen in FIG. 4. On the outer side of the ball cage 50, the balls extend into sloping grooves 106 in the plate 66 and the grooves are so arranged that their cam or ramp ends 108 engage the balls 54 when the cage 50 is rotated counter clockwise, as seen in FIG. 4, so that the balls riding up the ramps 108 will exert axially inward pressure on the friction plates to frictionally lock hub 22 against rotation relative to cup 12 and thereby lock the seat back against swinging or tilting movement.

A mounting plate 110 is fixedly secured to the plate 66, by bolts 112 or the like and extends upwardly therefrom, as shown in FIG. 2, where it is attached, such as by welding, to the seat back frame 4. Thus, the seat back frame is rigidly secured, operatively, to the hub 22. As shown in FIG. 3, the plate 110 has a slot 113 aligned with slot 84 and through which release pin 82 and sleeve 86 extend.

The outer wall 36 of the cup member 12 is also provided with an arcuate flange 114 (see FIGS. 1 and 5) having end edges 116 and 118. At least the end edge 118 serves to engage the outwardly extending portion of pin 82, previously described.

Referring now to FIGS. 4, 5 and 2, assume that the manually operable control is actuated to swing the lever 72 counterclockwise, as seen in FIG. 4. This action lifts pin 82 radially upwardly to a position outwardly of the outer peripheral edge 120 of flange 114 and at the same time the nose 76 of lever 72 forcibly rotates ball cage 50 clockwise against the action of spring 58 to move the balls 54 to the deeper portions of grooves 106 and thereby relieve all axial pressure from the friction plates 34 and 40 whereupon the mechanism is released and the seat back can be swung about the axis of bolt 26. As seen in FIG. 1, it will be apparent that release of the mechanism in the manner just described and swinging the seat back forwardly a short distance will cause pin 82 to engage and ride on the peripheral edge 120 of flange 114 and the mechanism will then be held in the released position during such forward swinging movement of the seat back. This is desirable since seat backs of this type are usually swung forwardly to lie substantially flat upon the seat itself to permit access to the rear seat of a two-door automobile and it is desirable that it be possible to swing the seat forwardly and then rearwardly without having to forcibly hold the mechanism unlocked during that time. Preferably flange 114 is of such length that release pin 82 remains on the edge 120 when the seat back is swung forwardly to the normal limit of its movement. Clearly, after the seat has been swung forwardly it may again be swung rearwardly with very little effort and without the necessity of again releasing pressure from the friction plates. As the seat swings rearwardly to the normal position shown in FIG. 1, the pin 82, under the influence of spring 102 drops inwardly and engages the end edge 118 of the flange 114. This action releases the ball cage 50 to the action of spring 58 and the friction plates are thereupon again frictionally pressed together and the mechanism is frictionally locked against any further rearward movement. The pin 82 engaging end edge 118 constitutes a positive lock against the seat back swinging in a forward direction until the mechanism is again released in the manner described.

With the parts in the normal position of FIG. 1, the spring 58 applies sufficient axial pressure to the friction plates to hold the seat in that position and it will be apparent that any effort to forcibly swing the seat back rearwardly (to swing plate 66 clockwise as seen in FIG. 4) will urge the plate 66 to cam the balls 54 axially inwardly and thus bind the friction plates even more tightly together. The lost motion between nose 76 and notch 78 and the loose fit of plates 34 on hexagonal hub 22 permit sufficient relative motion for this to occur. Thus the seat back can be adjusted to any desired reclining position and the mechanism is self energizing to lock it against further rearward movement by force applied to the seat back. However, the seat back can be pushed from the reclining position to its normal position (FIG. 1) without releasing the friction lock, the mechanism is self deenergizing in the forward direction.

When it is desired to swing the seat back rearwardly to a reclining position, it is only necessary to actuate the manual control lever described to relieve the friction plates of the pressure of the balls 54 and the seat back can then be pushed rearwardly the desired amount and the balls again released to effect a friction lock in that position. When in such a reclining position the seat back cannot be forced back rearwardly farther for the reasons already described but it will be apparent that relatively small forces urging the seats in a forward position would be effective to cause the balls 54 to move downwardly off the ramps 108 and thus relieve the friction plates of pressure and permitting the seat back to be pulled upwardly to the normal position of FIG. 1. Alternatively, the manually operable handle can be actuated to release the friction plates and a torsion spring, to be described will cause the seat back to swing upwardly. Thus, the mechanism can be said to be self energizing in one direction and self deenergizing in the other direction.

The seat back frame at the opposite side from the adjusting mechanism described is provided with a bracket 122 pivotally mounted on a nonrotatable stub shaft 124 having a perforated flattened portion 126 serving as an anchor for a torsion spring 132. The other end of torsion spring 132 engages an opening 128 in a cross member 130 of the seat back frame and the spring 132 is biased to normally urge the seat back to swing upwardly and forwardly. The cross member 130 is welded, at its opposite ends, to the plate 110 and the bracket 122. However, the force of spring 58 is sufficient to apply axial pressure to the friction plates sufficient to resist the tendency of spring 132 to swing the seat upwardly from a reclining position.

What is claimed is:

1. An adjusting mechanism for a tiltable seat back comprising: a first member adapted to be secured to a seat frame and defining an axis; a first plurality of friction plates axially slidable on said first member but held against rotation thereon about said axis; a second member adapted to be secured to a seat back mounted for rotation about said axis; a second plurality of friction plates axially slidable on said second member but held against rotation thereon about said axis, the plates of said first and second pluralities being mutually interleaved and defining a stack of plates; means at one end of said stack limiting axial sliding movement of said plates in one direction; a ball cage mounted on one of said members for rotation about said axis; balls carried by said cage and bearing at one side on the other end of said stack of plates and at the other side on cam means on said one member; resilient means urging said cage to rotate in a direction to cause said cam means to press said balls axially against said stack and thereby frictionally lock said members against relative rotation; and manually operable means for rotating said cage in a direction opposing the action of said resilient means and thereby relieve said stack from pressure of said balls.

2. A mechanism as defined in claim 1 wherein said manually operable means comprises a lever pivotally mounted on said one of said members and having an end portion operatively engaging said cage.

3. A mechanism as defined in claim 2 wherein said end portion extends loosely between spaced abutments provided on said cage providing lost motion between said lever and cage.

4. A mechanism as defined in claim 1 wherein said manually operable means is movably mounted on said one of said members; said manually operable means and the other one of said members being provided with abutments, mutually engageable when said manually operable means is positioned to release said cage to the action of said resilient means, to positively lock said members against relative rotation in one direction.

5. A mechansm as defined in claim 4 wherein said abutment on said other member comprises an arcuate radial flange having an end edge engageable by the abutment on said manually operable means and a peripheral edge arranged to hold said abutment on said manually operable means in a position to hold said cage rotated against said resilient means while relatively rotating said members through the arcuate extent of said flange.

6. A mechanism for adjusting the tilt of a tiltable seat back, comprising; a pair of members relatively rotatable about a common axis and adapted to be respectively secured to a seat and a tiltable seat back; releasable friction means between said members normally frictionally resisting relative rotation between said members; manually operable means mounted for generally radial movement on one of said members for releasing said friction means when moved to an outer position; an arcuate radial flange on the other member and having an end edge engageable with said manually operable means when in its inner position to thereby positively lock said members against relative rotation in one direction; said flange having a peripheral edge for holding said manually operable means in its outer position while said members are relatively rotating through the arcuate extent of said flange.

7. A mechanism as defined in claim 6 including resilient means normally biasing said manually operable means to move to its inner position.

8. A mechanism as defined in claim 6 wherein said friction means is self energizing in response to a force tending to relatively rotate said members in the other direction.

9. A mechanism as defined in claim 1 wherein said cam means are arranged to press said balls more firmly against said stack of plates upon relative rotation of said members in only one direction whereby said mechanism is self energizing in one direction and self deenergizing in the other direction.

References Cited
UNITED STATES PATENTS

| | | | |
|---|---|---|---|
| 2,980,170 | 3/1961 | Bechtold | 297—374 |
| 3,216,766 | 11/1965 | Tabor | 297—379 |
| 3,237,987 | 3/1966 | James | 297—374 |
| 3,423,785 | 1/1969 | Pickles | 297—379 |
| 3,426,386 | 2/1969 | Wise | 16—140 |

REINALDO P. MACHADO, Primary Examiner

U.S. Cl. X.R.

16—140; 297—379